United States Patent
Siponen

(10) Patent No.: US 6,353,749 B1
(45) Date of Patent: Mar. 5, 2002

(54) METHOD AND ARRANGEMENT FOR CONTROLLING THE OPERATION OF MOBILE COMMUNICATION EQUIPMENT IN A POWER-OFF STATE

(75) Inventor: Sakari Siponen, Oulu (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 08/934,191

(22) Filed: Sep. 19, 1997

(30) Foreign Application Priority Data

Sep. 25, 1996 (FI) .................................................. 963818

(51) Int. Cl.⁷ ................................................. H04B 1/38
(52) U.S. Cl. ........................ 455/574; 455/343; 455/425
(58) Field of Search ............................... 455/574, 517, 455/38.3, 127, 343, 572, 90, 575, 425, 556, 557, 573, 550, 566, 68; 370/310; 340/636, 539; 379/40, 41

(56) References Cited

U.S. PATENT DOCUMENTS

| | | | | |
|---|---|---|---|---|
| 3,657,563 A | * | 4/1972 | Davis | 340/347 |
| 4,731,814 A | * | 3/1988 | Becker et al. | 455/127 |
| 5,241,284 A | | 8/1993 | Nyqvist et al. | 330/297 |
| 5,291,542 A | | 3/1994 | Kivari et al. | 379/58 |
| 5,378,935 A | | 1/1995 | Korhonen et al. | 327/114 |
| 5,400,388 A | * | 3/1995 | Heo | 455/572 |
| 5,416,435 A | | 5/1995 | Jokinen et al. | 327/113 |
| 5,471,655 A | | 11/1995 | Kivari | 455/127 |
| 5,491,718 A | | 2/1996 | Gould et al. | 375/205 |
| 5,507,039 A | * | 4/1996 | Honma | 455/38.3 |
| 5,568,513 A | * | 10/1996 | Croft et al. | 455/38.3 |
| 5,570,369 A | | 10/1996 | Jokinen | 370/95.3 |
| 5,581,244 A | | 12/1996 | Jokimies et al. | 340/825.44 |
| 5,590,396 A | * | 12/1996 | Henry | 455/38.3 |
| 5,596,571 A | | 1/1997 | Gould et al. | 370/335 |
| 5,613,235 A | | 3/1997 | Kivari et al. | 455/343 |
| 5,642,063 A | | 6/1997 | Lehikoinen | 327/74 |
| 5,726,636 A | * | 3/1998 | Hayes, Jr. | 455/572 |
| 5,838,720 A | * | 11/1998 | Morelli | 455/38.3 |
| 5,845,204 A | * | 12/1998 | Chapman et al. | 455/38.3 |
| 5,878,336 A | * | 3/1999 | Cashen et al. | 455/574 |
| 6,047,169 A | * | 4/2000 | Dent | 455/38.3 |
| 6,073,035 A | * | 6/2000 | Witter | 455/574 |
| 6,088,576 A | * | 7/2000 | Sone | 455/38.3 |

FOREIGN PATENT DOCUMENTS

| | | |
|---|---|---|
| EP | 0438260 A3 | 7/1991 |
| EP | 0624003 A2 | 11/1994 |
| EP | 0719020 A2 | 6/1996 |

\* cited by examiner

Primary Examiner—Lester G. Kincaid
(74) Attorney, Agent, or Firm—Perman & Green, LLP

(57) ABSTRACT

Control of the operation of mobile communication equipment is provided in a power-off state, wherein a part of the mobile communication equipment is kept in operation for receiving and analyzing at least one of a set of excitation signals (VBAT, VCHAR, PWR_BTN, ALARM). Only a first part (30) of the mobile communication equipment, which essentially consists of timing means, is kept in operation continuously. A second part (29, 31, 32, 18) of the mobile communication equipment, provided for receiving and analyzing the signals, is controlled by means of the first part (30) to operate and analyze the signals during specified time intervals (t1), and to be inoperative at another time (t2). Power for a radio frequency (RF) transmitter and receiver of the second part is switched off during the power-off state. Analysis of the signals is accomplished during the power-off state.

14 Claims, 2 Drawing Sheets

METHOD AND ARRANGEMENT FOR CONTROLLING THE OPERATION OF MOBILE COMMUNICATION EQUIPMENT IN A POWER-OFF STATE

A method and arrangement for controlling the operation of mobile communication equipment in a power-off state

BACKGROUND OF THE INVENTION

The invention is related to controlling the operation of mobile communication equipment in a power-off state.

Mobile communication equipment, even in a power-off state, must be capable of reacting to certain excitation signals, and of changing to a power-on state in response to said signals. This is normally realized as follows: even in a power-off state, the power supply unit of mobile communication equipment is partly active, and it monitors certain signals which may provide an impulse that causes a change to a power-on state. Signals typically monitored in a power-off state correspond to battery voltage, charging, pressing of a power switch, and a clock alarm.

In a conventional implementation, the power supply unit of mobile communication equipment comprises control logic and an oscillator for generation of time constants. The type of oscillator used is not important as such in the solution explained herein, but a 2 kHz RC oscillator found in certain devices presently in use, and a 32 kHz crystal oscillator designed for newer devices, may be mentioned as examples. The monitored signals may be analog, direct voltage signals, whose level is monitored and compared to corresponding threshold voltages, or they may be digital signals, whose state is detected. For this, the power supply unit comprises a necessary number of comparators and reference voltages, as well as digital circuits for realizing the necessary state machine.

In solutions of the prior art, the signals are monitored continuously. The current consumption of comparators may be 100–400 $\mu$A, for example, and additionally, for example, about 100 $\mu$A of current is consumed in keeping the digital circuits on. Therefore, the current consumption of a power supply unit in a power-off state typically may be 300–450 $\mu$A, for example.

SUMMARY OF THE INVENTION

The purpose of the present invention is to provide a solution that may be used to noticeably decrease current consumption in a power-off state.

A method according to the invention for controlling the operation of mobile communication equipment in a power-off state, in which part of the mobile communication equipment is kept in operation for receiving and analyzing at least one signal, is characterized in that, in said method only a first part of the mobile communication equipment, which essentially consists of timing means, is kept in operation continuously, and a second part, provided for receiving and analyzing said signals, of the mobile communication equipment is controlled by means of said first part to operate and analyze said signals during specified time intervals, and to be inoperative at other times.

In an advantageous embodiment of the method, during each specified time interval the signals are sampled and the samples are analyzed. Furthermore, the signal samples may be multiplexed and analyzed consecutively during said specified time interval.

The specified time intervals may be one tenth or less of the total time, and, for example, of the order of 100 ms in duration.

An arrangement according to the present invention for controlling the operation of mobile communication equipment in a power-off state, in which part of the mobile communication equipment is kept in operation for receiving and analyzing at least one signal, is characterized in that, said part of the mobile communication equipment includes a first part, which essentially consists of timing means and is intended to be in operation continuously, and a second part, which is controlled by means of the first part to operate and analyze said signals at specified time intervals, and to be inoperative at another time.

In an advantageous embodiment, the second part includes means for taking samples of the signals during the specified time intervals, and it may also include means for multiplexing the samples.

In an advantageous embodiment the signals are direct voltage signals and the arrangement includes means for normalizing the signals. In that case, the means for analyzing the samples advantageously include means for comparing, by which each sample may be compared in succession to the same reference voltage.

A noticeable savings in the power consumption of mobile communication equipment in a power-off state is realized by means of the method and arrangement according to the present invention. During the interval between samplings, the current supply is also switched off in the power supply unit, except for the sampling timing circuit, which may be realized using a clock divider, for example. In an advanced implementation, a timing circuit requires 10–50 $\mu$A of current. As the interval between samplings grows, the average current consumption of the entire power supply unit in the power-off state approaches this current. At the same time the structure of the power supply unit can be simplified, because after the samples are multiplexed, they can be analyzed using the same means.

BRIEF DESCRIPTION OF THE DRAWING

The present invention and certain of its embodiments are explained in more detail in the following, with references to the enclosed drawings.

DETAILED DESCRIPTION OF THE INVENTION

Figure 1:
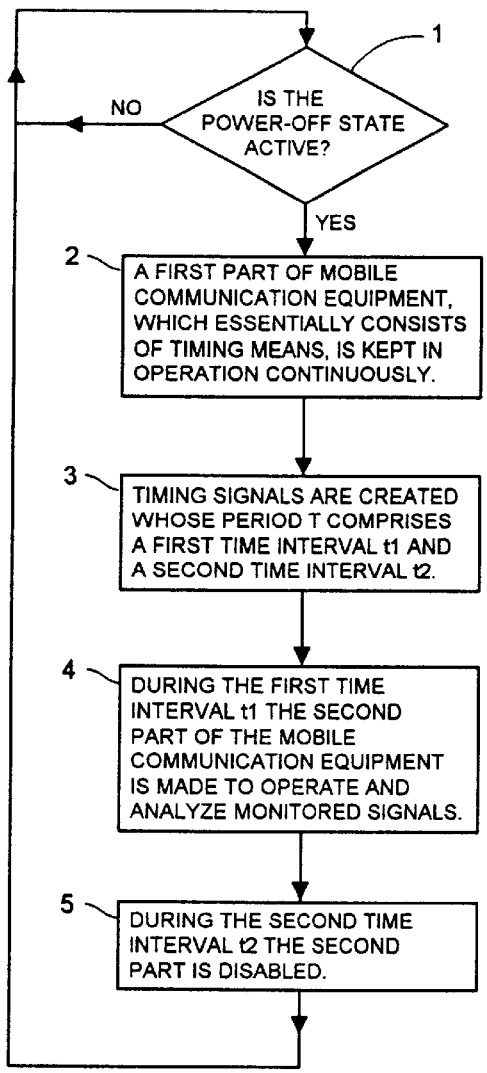
FIG. 1 is a flow chart that presents an embodiment of a method according to the present invention.
Figure 2:
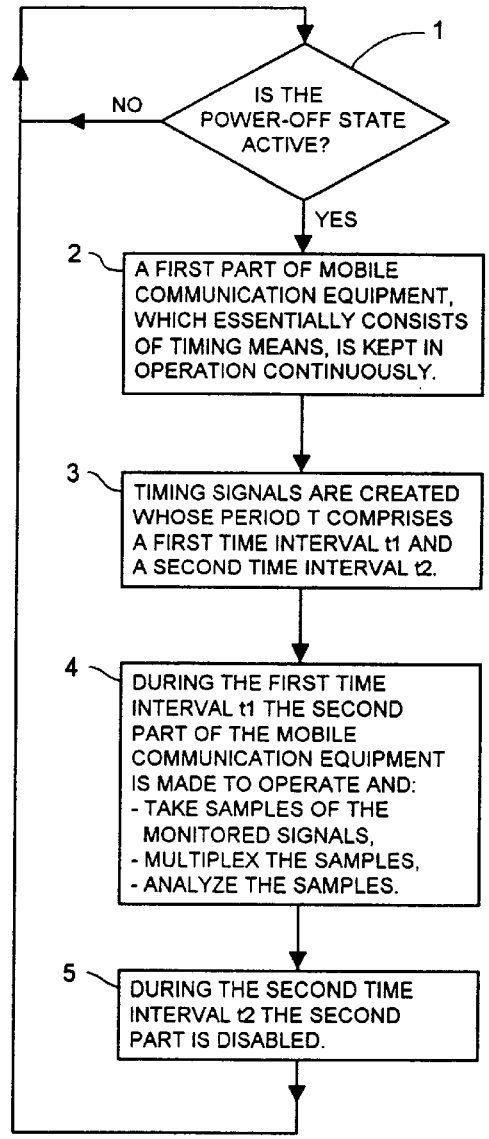
FIG. 2 is a flow chart that presents another embodiment of the method according to the present invention.

Certain embodiments of the method according to the present invention are explained in the following, with references to FIGS. 1, 2, and 3. In the flow charts of FIGS. 1 and 2, phase 1 is performed until it is determined that the mobile communication equipment is in a power-off state. This may be realized in practice, for example, as follows. A signal is received from the control logic of a power supply unit. A change in the state of the signal indicates that a power-off state has been entered, whereupon implementation of the method begins. It is characteristic of the method that only a first part of the mobile communication equipment, which essentially consists of timing means, is kept continuously in operation, as indicated by reference number 2. As shown by phase 3, the timing means create a timing signal, whose timing period T is formed from a first time interval ti and a second time interval t2, in the manner shown by the first part of the timing diagram (a) of FIG. 3. The time interval ti is advantageously noticeably shorter than the time interval t2. The flow charts of FIGS. 1 and 2 differ from each other only in phase 4. In the method according to the present invention, shown in FIG. 1, a second part of the mobile communication equipment begins to operate and analyze the signals being monitored during the first time interval t1. In the primary embodiment of the method, shown in FIG. 2, which differs from the embodiment of FIG. 1 only in phase 4, samples of the monitored signals are taken and multiplexed, after which they are analyzed. This happens entirely during the first time interval. The monitored signals may be, for example, a battery voltage signal, a charger detection signal, a signal indicating the state of a power button, and an alarm signal received from a real time clock. It is characteristic of the method that operation of the second part of the mobile communication equipment is disabled except during the first time intervals t1. In other words operation is disabled during the time intervals t2, as indicated by reference number 5. If the power-off state is still active, only the first part of the mobile communication equipment, which essentially consists of timing means, is kept in continuous operation, and so on.

Figure 3:
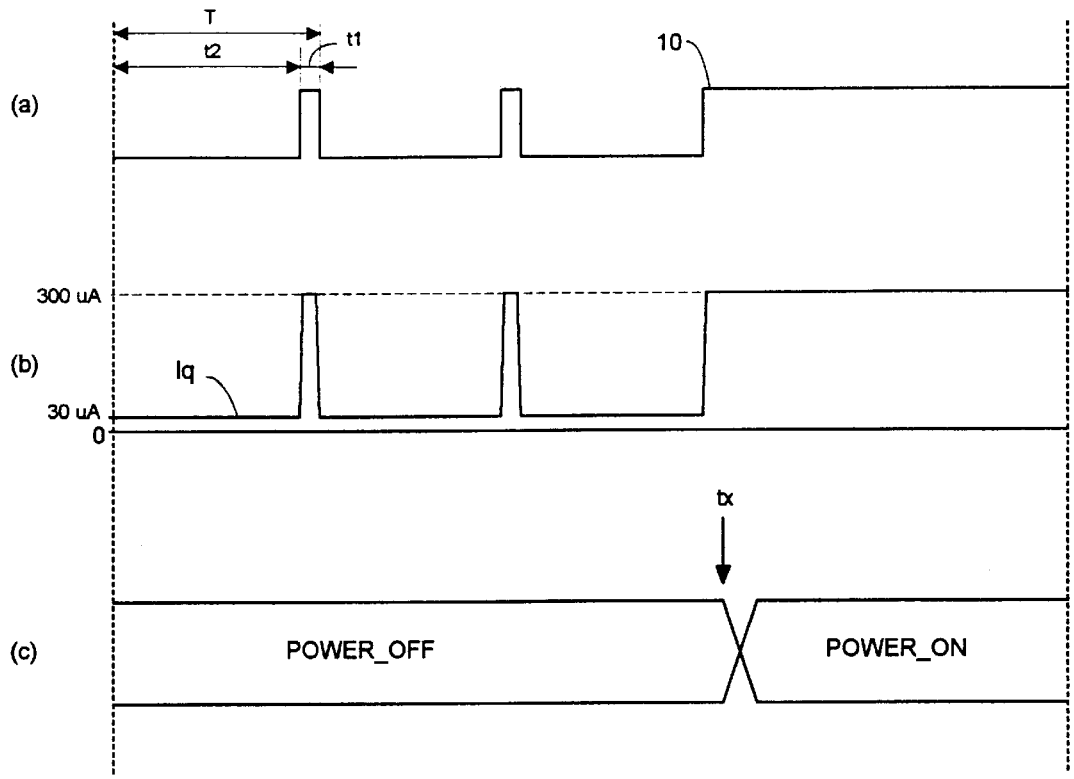
FIG. 3 is a timing diagram that illustrates the method according to the present invention.

The timing diagram (b) of FIG. 3 illustrates the current consumption $I_q$ in the power supply unit of the mobile communication equipment when the method according to the present invention is applied. During the time interval t2, the only active circuits in the power supply unit are those needed to create timing signals, such as a clock divider, whose current consumption may be 30 µA, as shown in the timing diagram. During the time interval t1, the means for sampling, multiplexing and signal analysis are active, in addition to at least part of the control logic of the power supply unit, and current consumption may be 300 µA, for example, as shown in the timing diagram (b). Operation can be realized using a function similar to a logic OR function, so that a power-on state is entered if an impulse is received from one or more signals. This is detected when the samples are analyzed during the first time interval, and if a impulse is detected, a change is made to continuous monitoring of the signals received in phase 10, by ending creation of timing signals for sampling, as shown in the timing diagram (a) of FIG. 3. The current consumption $I_q$ correspondingly remains at a higher level as shown by the timing diagram (b), and at moment $t_x$ the state changes from a power-off state to a power-on state as shown by the timing diagram (c).

Figure 4:
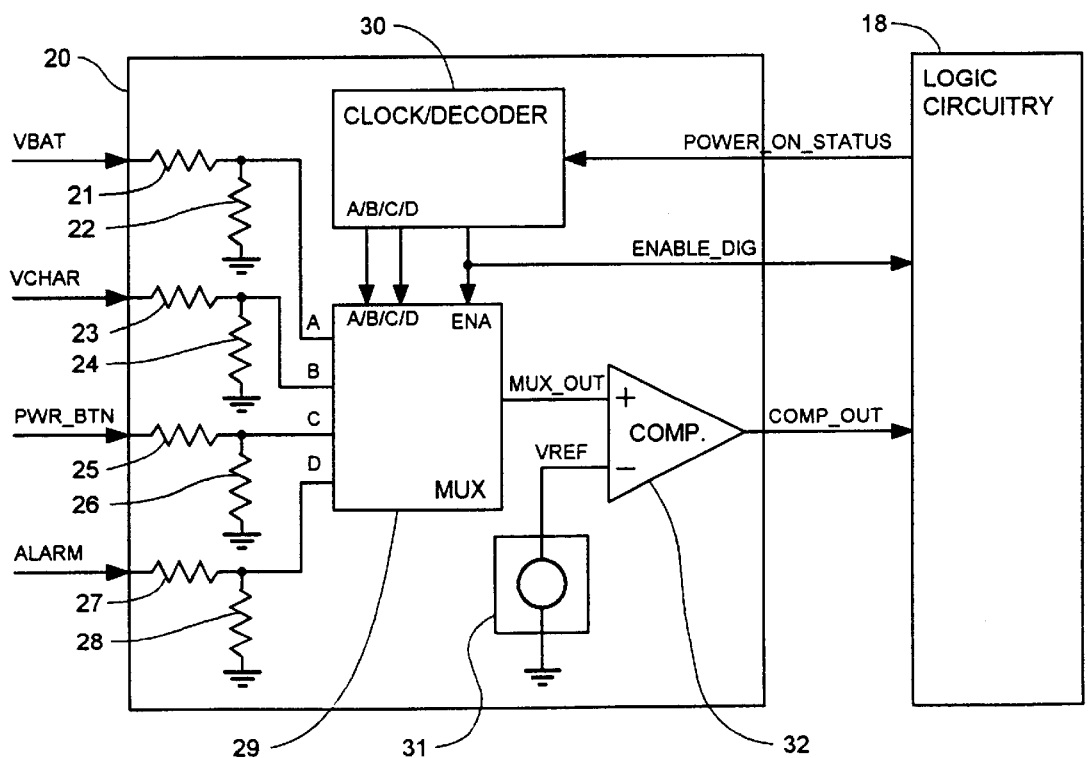
FIG. 4 is a block diagram that presents an embodiment of an arrangement according to the present invention.

FIG. 4 presents a block diagram of a possible embodiment of an arrangement according to the present invention. The parts of a power supply unit of mobile communication equipment that are essential in an arrangement according to the present invention are diagrammatically shown. Part 20 of the power supply unit receives a battery voltage signal VBAT, a charger detection signal VCHAR, a power button state signal PWR_BTN and an alarm signal of a real time clock ALARM. Any one of these signals may give an impulse, whereupon the device enters a power-on state. VBAT and VCHAR are analog direct voltage signals, whose level is monitored, and PWR_BTN and ALARM are digital signals, whose state is monitored. PWR_BTN gives an impulse when the power switch button of the device is pressed, and ALARM is a signal that gives an impulse to drive the device into a power-on state at a certain preset time. The nominal value of VBAT may be 3 V, for example, and the level of charger detection signal VCHAR may be 0.5 V, for example. Signals PWR_BTN and ALARM may be at zero except in an excited state, when they change to the voltage level of the battery voltage, such as 3 V.

Analysis of all the above-mentioned signals can be returned to signal-level analysis, which can be advantageously realized by normalizing the signals so that they can all be compared to the same threshold voltage. In this example case, the threshold voltage can be 0.5 V, and normalization is realized using suitable voltage dividers 21, 22; 23, 24; 25, 26; and 27, 28 at the outputs of signals VBAT, VCHAR, PWR_BTN and ALARM.

The part 20 of the power supply unit described here includes, first of all, block 29, which receives normalized signals at its inputs A, B, C and D, and performs sampling and multiplexing. The multiplexed samples are consecutively conducted to a comparator 32, which compares them to a reference voltage VREF obtained from a power supply 31. The output of the comparator is connected to the control logic 18 of the power supply unit for analysis. If during the analysis it is determined that one of the signals has given an impulse requiring a change into the power-on state, the control logic performs the necessary actions and outputs the necessary controls. Part 20 also includes a clock/decoder block 30, which creates timing signals for sampling. Block 30 receives a control signal POWER_ON_STATUS from the control logic, the state of which signal indicates whether or not the power-off state is active. If the control signal indicates that the power-off state is active, timing signals are created in the clock/decoder block 30 according to the beginning of the timing diagram (a) of FIG. 3, and correspondingly, signal ENABLE_DIG is produced, which activates logic unit 18 during the time interval t1 to detect the state of the output of comparator 32 of block 20. Signal ENABLE_DIG disables operation of the logic unit during the time interval t2. The clock/decoder 30 also produces another clock frequency that times sampling. Sampling of four signals can be controlled using two bits, which are conducted from block 30 to input A/B/C/D of block 29.

As it was stated earlier, the timing signals needed for periodic sampling are easily obtained, because in any case the power supply unit of mobile communication equipment contains an oscillator, and suitable timing signals are obtained from its frequency by means of clock dividers. Suitable timing of sampling could be implemented as follows. Once a second, during a 100 millisecond first time interval t1, consecutive samples of said four signals are first taken, and the samples are then multiplexed and analyzed during the same time interval. During this 100 millisecond interval, all the necessary circuit parts are enabled, after which they are disabled for the next 900 milliseconds.

If one of the signals monitored during the power-off state gives an impulse and a change is made to a power-on state, it is no longer necessary to analyze signals PWR_BTN and ALARM. Depending on the monitoring need, decoding of the multiplexing can be modified, for example, so that the VBAT signal is continuously monitored and the status of the charger is monitored once a second, meaning that a sample of signal VCHAR is taken and analyzed.

It is advantageous to realize the arrangement according to the present invention by integrating as much of it as possible in an ASIC circuit of a power supply unit, which is a typical solution in mobile communication equipment. The present invention may vary within the scope of the enclosed claims.

What is claimed is:

1. A method for controlling the operation of mobile communication equipment in a power-off state, in which part of the mobile communication equipment is kept in operation for receiving and analyzing at least one excitation signal (VBAT, VCHAR, PWR_BTN, ALARM), wherein, said method comprises steps of:

keeping only a first part (30) of the mobile communication equipment, which essentially consists of timing means, in continuous operation, and controlling a second part (29, 31, 32, 18), provided for receiving and analyzing said signals of the mobile communication equipment, by means of said first part (30) to operate and analyze said signals during specified time intervals (t1), and to be inoperative at another time (t2), wherein radio frequency (RF) components of the second are powered-off during the power-off state; and wherein said analyzing of said signals is accomplished during said power-off state.

2. The method according to claim 1, wherein, during each specified time interval (t1), there are steps of sampling and analyzing samples of the signals (VBAT, VCHAR, PWR_BTN, ALARM.

3. The method according to claim 2, wherein the signal samples are multiplexed and consecutively analyzed.

4. The method according to claim 2, wherein, before the sampling step, there is a step of normalizing the signals, and the samples are analyzed by comparing them to a reference voltage (VREF).

5. The method according to claim 1, wherein the specified time intervals (t1) are one tenth or less of the total time of the power-off state.

6. The method according to claim, 1 wherein the length of the specified time intervals is of the order of 100 ms or less.

7. The method according to claim, 1 wherein the signals (VBAT, VCHAR, PWR_BTN, ALARM) are direct voltage signals.

8. An arrangement for controlling the operation of mobile communication equipment in a power-off state, in which part of the mobile communication equipment is kept in operation for receiving and analyzing at least one excitation signal (VBAT, VCHAR, PWR BTN, ALARM), wherein the arrangement includes:

a first part (30), which essentially consists of timing means and is intended to be in operation continuously, and a second part (29, 31, 32, 18), which is controlled (ENA, ENABLE_DIG) by the first part (30) to operate and analyze said at least one signal at specified time intervals (t1), and to be inoperative at another time (t2);

wherein radio frequency (RF) components of the second part are powered-off during the power-off state; and wherein analyzing of said at least one signal is accomplished during said power-off state.

9. The arrangement according to claim 8, wherein the second part includes means (29, 30) for taking samples of the signals (VBAT, VCHAR, PWR_BTN, ALARM) during the specified time intervals (t1).

10. The arrangement according to claim 9, wherein the second part further includes means (29) for multiplexing the samples.

11. The arrangement according to claim 8, wherein the signals (VBAT, VCHAR, PWR_BTN, ALARM) are direct voltage signals and the arrangement includes means (21, 22; 23, 24; 25, 26; 27, 28) for normalizing the signals.

12. The arrangement according to claim 11, wherein the means for analyzing the samples include means for comparing (31, 32), by which each sample may be compared in succession to the same reference voltage (VREF).

13. In mobile communication equipment operable in a power-on state for communicating between the mobile equipment and a distant location, and operable in a power-off state to enable a reaction of the mobile equipment to an excitation signal, a method for controlling the operation of mobile communication equipment in the power-off state, in which part of the mobile communication equipment is kept in operation for receiving and analyzing at least one excitation signal (VBAT, VCHAR, PWR_BTN, ALARM), wherein, said method comprises steps of:

keeping only a first part (30) of the mobile communication equipment, which essentially consists of timing means, in continuous operation, and controlling a second part (29, 31, 32, 18), provided for receiving and analyzing said signals of the mobile communication equipment, by means of said first part (30) to operate and analyze said signals during specified time intervals (t1), and to be inoperative at another time (t2); and wherein in the power-off state, radio frequency (RF) components of the second part are powered-off; and said analyzing of said signals is accomplished during said power-off state.

14. A method for controlling the operation of mobile communication equipment in a power-off state, in which part of the mobile communication equipment is kept in operation for receiving and analyzing at least one excitation signal of a set of excitations signals (VBAT, VCHAR, PWR_BTN, ALARM) wherein, said method comprises steps of:

keeping only a first part (30) of the mobile communication equipment, which essentially consists of timing means, in continuous operation; and controlling a second part (29, 31, 32, 18), provided for receiving and analyzing said signals of the mobile communication equipment, by means of said first part (30) to operate and analyze said signals during specified time intervals (t1), and to be inoperative at another time (t2);

wherein radio frequency (RF) components of the second part have their power switched off during the power-off state, and each of said excitation signals may be present during power-down of said transmitter and said receiver; and wherein said analyzing of said signals is accomplished during said power-off state.

\* \* \* \* \*